May 31, 1966     J. R. CHIVERS     3,253,535
TOASTER HAVING A BIMETALLIC CONTROL ELEMENT
Filed Aug. 22, 1963     4 Sheets-Sheet 1

INVENTOR.
James R. Chivers
BY Robert T. French

May 31, 1966     J. R. CHIVERS     3,253,535
TOASTER HAVING A BIMETALLIC CONTROL ELEMENT

Filed Aug. 22, 1963     4 Sheets-Sheet 2

INVENTOR.
James R. Chivers
BY

May 31, 1966  J. R. CHIVERS  3,253,535
TOASTER HAVING A BIMETALLIC CONTROL ELEMENT
Filed Aug. 22, 1963  4 Sheets-Sheet 3

INVENTOR.
James R. Chivers
BY Ralph T. French

INVENTOR.
James R. Chivers
BY Robert T. French

United States Patent Office 3,253,535
Patented May 31, 1966

3,253,535
TOASTER HAVING A BIMETALLIC CONTROL ELEMENT
James R. Chivers, Longmeadow, Mass., assignor to Westinghouse Electric Corporation, Pittsburgh, Pa., a corporation of Pennsylvania
Filed Aug. 22, 1963, Ser. No. 303,844
3 Claims. (Cl. 99—329)

This invention relates to electric toasters of the automatic or "pop up" type and concerns particularly such toasters in which the toasting cycle is controlled by a bimetallic element in a "heat-up cool-down" arrangement.

Many automatic electric toasters in which the toasted bread pops up to a partially exposed position upon completion of the toasting operation control the period of time during which the bread is subjected to toasting temperature by means of a bimetallic element that in heating up and cooling down determines the length of that period. This arrangement works well except that with the toasting of a number of slices in quick succession the ambient temperature to which the bimetallic element is exposed rises because of retention of heat by and within the toaster housing. This change in temperature affects the operation of the bimetallic element, thereby altering the length of the toasting cycle and, of course, the degree to which the bread is toasted, and necessitating readjustment of a "light-dark" control from time to time (the operator then usually leaving it in the wrong position for the first slices to be toasted on the next occasion the toaster is operated). There is a real need for remedying this disadvantage without sacrificing the simplicity in construction and dependability in operation of such a toaster.

A primary object of the present invention is provision of an automatic electric toaster having a "heat-up cool-down" toasting control element with internal ambient temperature compensation.

Another object is stabilization of the length of the toasting cycle in an automatic electric toaster having a "heat-up cool-down" control element of bimetallic type.

A further object is combination of bimetallic control elements in an automatic electric toaster.

Other objects of this invention, together with means and methods for attaining the various objects, will be apparent from the following description and accompanying diagrams of a preferred embodiment of the invention.

In general, the objects of the present invention are accomplished by providing an electric toaster of electric toaster of automatic or "pop up" type with a fixed frame, a bread carriage movable relative thereto between toasting and non-toasting positions, a latch for engaging the carriage to retain it in toasting position, temperature-responsive means for determining the duration of a toasting period and for disengaging the latch automatically at the conclusion thereof and thereby permitting the carriage to return toward non-toasting position, means for biasing the latch to the engaged position, and means for varying the latch-engaging bias to compensate for the effect of the ambient temperature in the vicinity of the disengaging means upon the determination of the toasting period thereby. The invention contemplates particularly a spring as the latch-biasing means, with one end thereof supported on a bimetallic member adapted to flex to vary the latch-engaging bias inversely with the ambient temperature.

Figure 1:
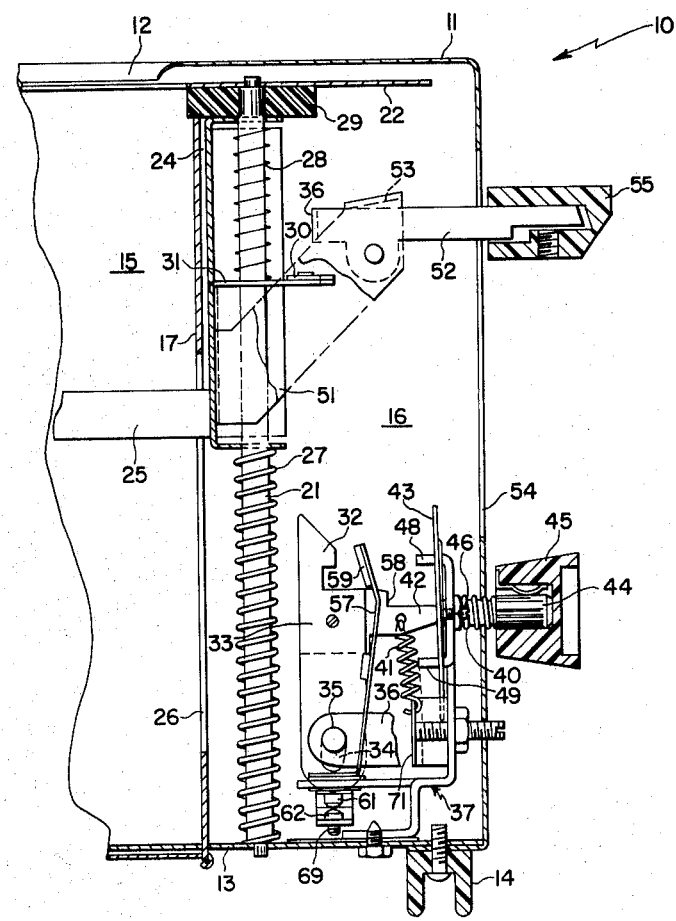
FIG. 1 is a left side elevation, partly in section, of a portion of a toaster embodying the present invention, with the bread carriage in the uppermost, non-toasting position.

FIG. 1 shows, in side elevation and partly in section, a portion of a toaster 10 having a fixed frame including a housing 11 inverted over and attached to a base 13 supported on feet 14 (one visible in this view). The top of the housing has one or more slots 12 (part of one being visible) therein to receive slices of bread or the like for toasting in the oven or heating compartment located therebelow. A heating compartment 15 occupies most of the space inside the housing and is separated from a smaller control compartment 16 by a partition 17. The structural features of the present invention are located in the control compartment and are described and illustrated in detail. The heating compartment and means for heating it are wholly conventional and, being well known, are not further illustrated or described except for schematic illustration of the heating means in FIG. 3 and brief description thereof.

Figure 2:
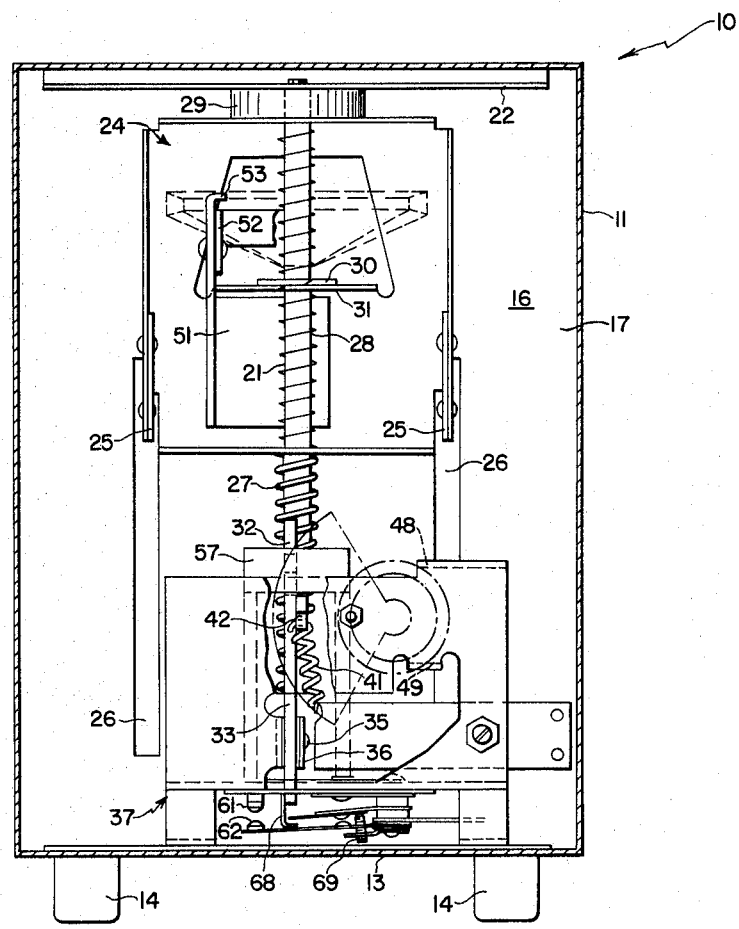
FIG. 2 is an end elevation, partly cut away and in section, corresponding to the side elevation of FIG. 1.

FIG. 2 shows, in end elevation (partly cut away and in section) structural elements supported by the frame, most of which were visible in side elevation in FIG. 1. An elongated post or guide rod 21 extends vertically from an aperture in the base 13 to an aperture in a horizontal sheet 22 supported in part by the partition 17 and spaced from the overlying portion of the housing 11. A carriage 24 is mounted for vertically reciprocating movement on the guide rod, which extends through apertures in top and bottom flanges thereof. A pair of bread-supporting bars 25, which are attached to opposite side flanges of the carriage, extend horizontally through a pair of vertical slots 26 in the partition 17 and into the heating compartment. A biasing spring 27 surrounding the guide rod 21 below the bottom flange of the carriage is compressible between that flange and the base 13 when the carriage is depressed from the illustrated position, which is the extreme non-toasting position. A loose helical spring 28 surrounds the guide rod between the top and bottom flanges of the carriage. A resilient bumper member 29 surrounds the upper portion of the guide rod immediately below the horizontal sheet 22.

The mechanism for latching the carriage 24 in the toasting position is essentially like that disclosed by B. F. Parr in U.S. Pat. 3,029,725 although the details differ somewhat. The carriage 24 has a central horizontal bracket 31 extending therefrom with an aperture therein (not shown directly) adapted to receive, and an adjacent wear strip 30 to retain, a hook 32 formed at the upper end of an upstanding latch member 33 supported at its lower end, which is provided with a vertical slot 34 therein, for pivotal and limited sliding motion, on pin 35. The pin is retained in a support arm 36 affixed to a frame superstructure 37, which is fastened to the base 13. A desegmented disc cam 43 is affixed to one end of the rotatable shaft 44, which is surrounded by a spring 40. One face of the cam bears against an adjusting screw 46 threaded through an upstanding portion of the superstructure 37, while the opposite face is juxtaposed to the free end of an arm 42, which is affixed to the latch member and extends substantially horizontally therefrom in the direction in which the hook 32 extends from the latch member (to the right in FIG. 1). The end of arm 42 acts as a cam follower, controlling the degree of engagement of the hook 32. A pair of ears 48, 49 on the superstructure limit the rotation of the cam. The other end of the cam shaft extends through the housing 11 to the exterior, where it carries a "light-dark" control in the form of rotatable knob 45. A biasing spring 41 for the latch is attached to the arm 42 and is discussed further hereinafter.

A bracket 51 extending obliquely from the carriage 24 carries a lever arm 52 pivotally thereon, the degree of pivoting being limited by a flange 53 on the bracket and overlying a portion of the upper edge of the arm. This lever arm extends through a vertical slot 54 in the housing 11 and carries a fixed knob 55 on its exterior end. Its flanged interior end 56 is juxtaposed in the toasting position to the tapered upper edge of the hook 32. A yoke-shaped bimetallic member 57 affixed at its lower ends to the superstructure 37 (but electrically insulated therefrom) extends upward flanking the latch member 33 and bridges the arm 42 extending therefrom, which has notch 58 in the upper surface thereof. The bridging portion of the yoke-shaped bimetallic member is faced with electrically insulating strip 59 on the side toward the hook 32.

Figure 3:
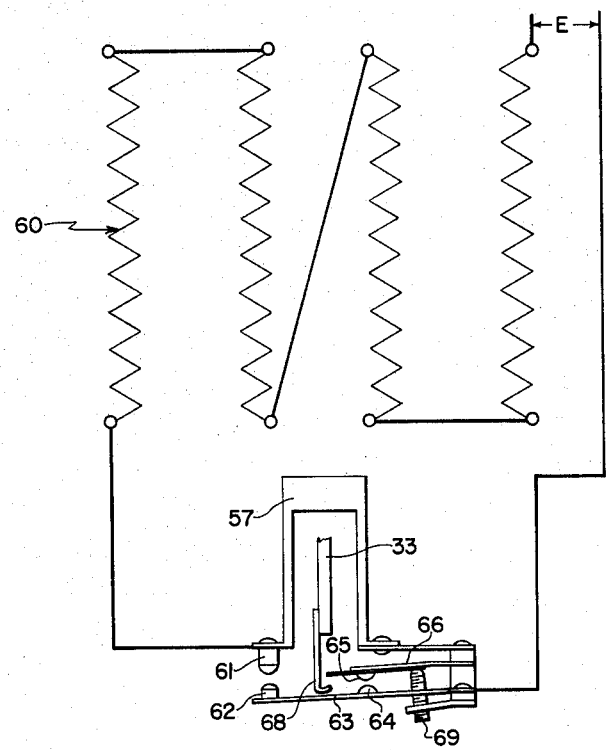
FIG. 3 is a schematic representation of electrical circuit components of the apparatus of the preceding views.

FIG. 3 shows the bimetallic member and the rest of the electrical circuitry of the toaster in some detail, partially schematically. Two pairs of contacts, suitably insulated, are supported from the underside of the superstructure 37, as also shown in FIG. 2. A contact 61 on the superstructure is opposed to (shown spaced from) a contact 62 at the free end of a long contact arm 63, which carries at an intermediate location thereon a contact 64 opposed to (shown spaced from) a contact 65 on a short contact arm 66. Closing of only the second pair of contacts (64, 65) establishes a circuit from an external power source E through both a heating coil 60 for the heating compartment and the yoke-shaped bimetallic member, and closing of the first pair of contacts (61, 62) establishes a circuit through the heating coil only. A hook 68 on the bottom of latch member 33 depresses the longer contact arm 63 and is adapted to lift the shorter contact arm 66. Adjustment of a set screw 69 bearing against the underside of the shorter contact arm determines the spacing of the respective arms from one another.

Figure 4:
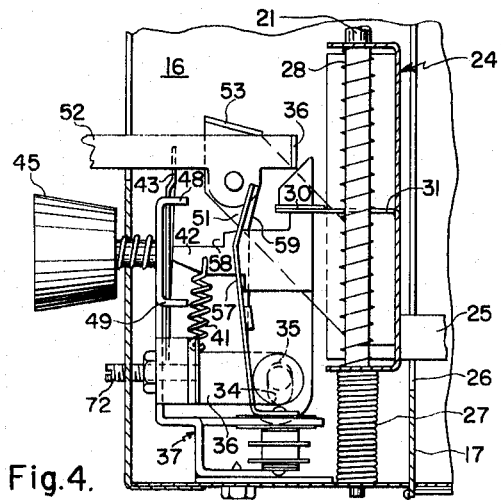
FIG. 4 is a right side elevation, partly in section, of a portion of the apparatus of the preceding views with the bread carriage lowered, in toasting position.
Figure 7:
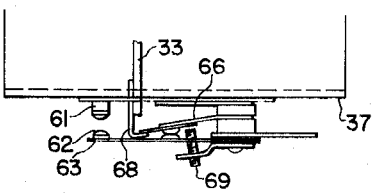
FIG. 7 is a fragmentary end elevation showing the electrical contacts of the same apparatus, positioned corresponding to the carriage position in FIG. 4.
Figure 5:
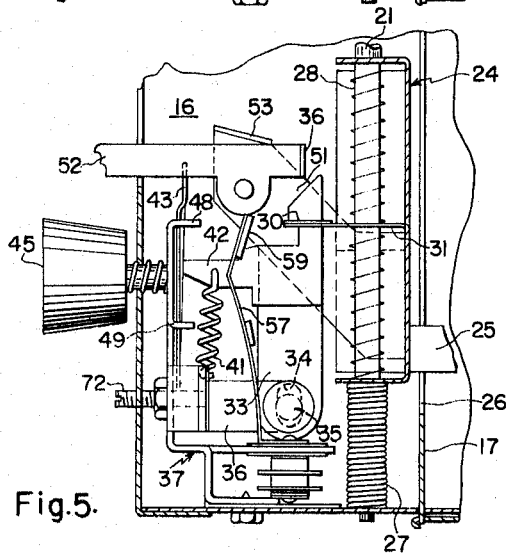
FIG. 5 is a view similar to FIG. 4 but with the bread carriage slightly higher, still in toasting position.

Operation of the latching mechanism is readily understood by reference to subsequent views. Depression of the fixed knob 55 by the toaster operator lowers the carriage 24, whereupon bread carried on the attached bread-supporting bars drops out of sight into the heating compartment 15, and the hook 32 on the latch member 33, biased toward the engaged position by the spring 41 engages the bracket 31 on the carriage and retains it in such lowered toasting position, as shown in FIG. 4, which is a view from the opposite side from which FIG. 1 is taken. FIG. 7 shows that only the second pair of electrical contacts (64, 65) is closed when the carriage is in such toasting position, so that both the heating coil and the yoke-shaped bimetallic member 57 are energized. As the bimettalic member heats from the flow of electrical current therethrough, it deflects at its bridging portion toward the notch 58 in the arm 42 attached to the latch member, eventually permitting the latch member to rise on its pivot pin by the depth of the notch at the urging of the compressed spring 27 against the bottom flange of the carriage, as shown in FIG. 5.

Figure 8:
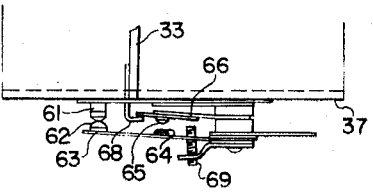
FIG. 8 is a view similar to FIG. 7 but with the contacts positioned corresponding to the carriage position in FIG. 5.

The corresponding position of the electrical contacts appears in FIG. 8, which shows that the circuit to the bimetallic member is interrupted but the flow of current to the heating coil is continued, as will be apparent from reference to FIG. 3 and the previous description. This completes the first or heating portion of the cycle of operation, which is of the so-called "heat-up cool-down" type.

Figure 6:
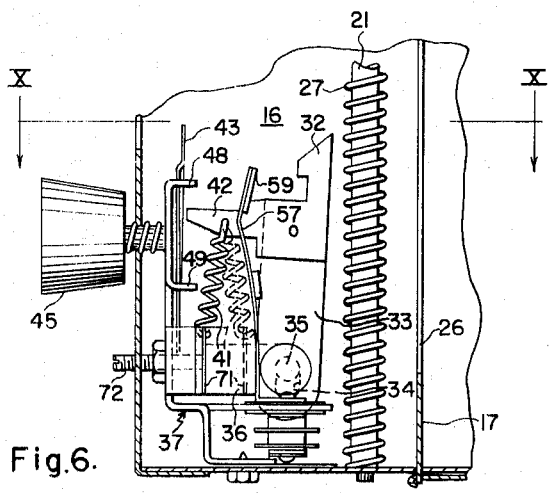
FIG. 6 is another right side elevation, partly in section, with the bread carriage raised out of sight, to a non-toasting position.
Figure 9:
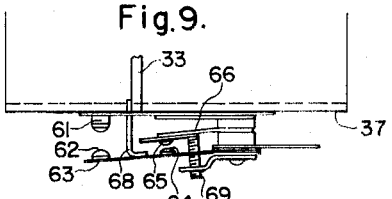
FIG. 9 is another fragmentary view similar to FIGS. 7 and 8 but with the contacts positioned according to the carriage position in FIG. 6.

As the bimetallic member cools, it deflects toward the latch member and, being engaged in the notch 58 on the attached arm 42, pivots the latch member sufficiently, as shown in FIG. 6, to disengage the hook 32 from the bracket 31, whereupon the carriage 24 is forced upward by the compressed spring 27 to the position shown in FIGS. 1 and 2. As also shown in those previous views, the released latch member is pulled downward and forward on its pivot pin by the biasing spring 41 so that, as shown in FIG. 9, the bottom hook 68 depresses the contact arm 63 sufficiently to space apart the contacts in both pairs, interrupting all current flow. The "heat-up cool-down" cycle is then complete.

Lifting of the knob 55 also will release the carriage from toasting position at any time by bringing the angled interior end 56 of the lever arm 52 into contact with the tapered edge of the hook 32, disengaging it. In any event, as the carriage rises, propelled by expansion of the compressed spring 27, to the uppermost or extreme non-toasting position (in which bread carried on the supporting bars 25 is partially exposed outside the slots 12 in the heating compartment portion of the housing 11), the top flange of the carriage comes into forcible contact with the resilient bumper member 29 located at the top of the guide rod 21 on which the carriage rides, cushioning the shock of that contact.

Also shown in FIGS. 1 and 2 and in FIGS. 4 to 6 are elements utilized, together with the now conventional elements already described, in the practice of the present invention. The biasing spring 41 for the latch member 33 is attached at the top to the arm 42 affixed to the latch member and extending therefrom as previously described. The bottom end of the spring 41 is attached to the free end of a rectangular bimetallic member 71, which is affixed at its opposite end to a portion of the superstructure 37. A set screw 72 (with lock nut) is threaded through the superstructure and into contact with one face of this bimetallic member, which responds solely to ambient temperature, not having any electrical connection for internal heating.

Figure 10:
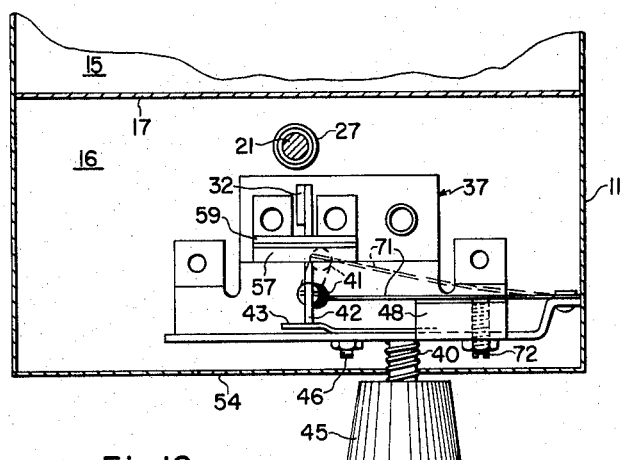
FIG. 10 is a sectional plan of the same apparatus taken at X—X of FIG. 6.

The operation of the rectangular bimetallic member 71, which functions to compensate for variation in the ambient temperature about the biasing spring 41 for the latch member 33, will become apparent from further consideration of FIG. 6, already partially described, together with FIG. 10, which is a sectional plan taken thereon as indicated. In both of these views, the compensating bimetallic member 71 is shown in a displaced position (represented in broken lines) corresponding to a high ambient temperature about the biasing spring 41 in which its free end has swung toward the latch member, as well as in its original position corresponding to a low ambient temperature about the biasing spring 41. Such displacement also swings the bottom end of the biasing spring 41 toward the latch member, thereby decreasing the bias on latch 33 and thus facilitating disengagement of the hook 32 thereof from the carriage bracket 31 to release the carriage.

It will be understood that as the toaster is used steadily for an appreciable period of time the entire toaster gets warmer, chiefly from conduction of heat throughout its various members. The ambient temperature in the control compartment 16 rises sufficiently to affect the position of the yoke-shaped bimetallic member 57, which controls the unlatching of the carriage. The retarded cooling of that bimetallic member after it has been deenergized but while the heating coil is still energized tends to lengthen the toasting cycle. However, as the ambient temperature increases, the compensating bimetallic member 71 flexes toward the illustrated displaced position and expedites the unlatching of latch member 33 notwithstanding the yoke-shaped bimetallic member 57 being at a higher temperature than that at which the unlatching normally would occur. Suitable choice of the dimensions and materials, as is within the capability of a person having normal skill in the art, in the light of the present teaching, will result in an essentially constant toasting interval after the temperature in the toasting compartment has stabilized regardless of the ambient temperature in the control compartment. The benefits and advantages thereof are obvious.

The preferred apparatus embodiment of this invention, as illustrated and described, may be modified in structure or function without departing from the inventive concept. Parts may be combined or subdivided, added to or substituted for one another, and other modifications made while retaining advantages and benefits of the invention, which is defined in the following claims.

I claim:

1. In a toaster having a toasting compartment, a fixed frame, a bread carriage movable relative thereto between toasting and non-toasting positions, latch means mounted on the frame and adapted to engage the carriage and retain it temporarily in toasting position, disengaging means mounted on the frame and adapted to disengage the carriage from the latch means after a toasting period and thereby permit the carriage to return to non-toasting position and including a thermally responsive control member of the heat-up cool-down type adapted to determine the toasting period by its heating-cooling cycle, biasing means for urging the latch means into engagement with the carriage and including a spring having one end affixed to the latch means and having its opposite end interconnected to compensating means mounted on the frame, said compensated means including a temperature responsive element adapted to move said opposite end of said biasing spring to vary, inversely with respect to the ambient temperature in the vicinity of the disengaging means, the bias applied thereto to engage the carriage in the toasting position and thereby provide an essentially constant toasting period after stabilization of the temperature in the toasting compartment.

2. In a toaster, a fixed frame, a bread carriage movable relative thereto between toasting and non-toasting positions, latch means movably mounted on the frame and including a hook member adapted to engage the carriage upon movement of the carriage to toasting position and to retain it until disengaged therefrom, a biasing spring adapted to urge the hook member into latching engagement with the carriage, a movable support member connected to the spring and supported on the said frame, said movable support including a bimetallic element adapted to flex to vary the length of said biasing spring thereby decreasing spring tension upon increase of the ambient temperature, a thermally responsive control having a heat-up cool-down cycle and including a bimetallic member adapted to disengage the hook member from the carriage during the cool-down half cycle, and means for returning the disengaged carriage to non-toasting position.

3. In a toaster having a toasting compartment, a fixed frame, a carriage movable between toasting and non-toasting positions, means biasing the carriage toward non-toasting position, means for retaining said carriage in toasting position and for releasing it therefrom comprising a latch lever, means providing a lost motion connection between the latch lever and the frame for pivotal movement and limited longitudinal movement of the lever relative to the frame, the latch lever having a first latch surface and an opposing second latch surface, a finger mounted on the carriage and adapted to be engaged by the first latch surface of the latch lever to retain the carriage in toasting position, means including a spring biasing the latch lever toward one limit of its longitudinal movement and toward engagement of the first latch surface with the carriage finger, a thermally responsive control of the heat-up cool-down type comprising a first bimetallic member interconnected at one end to the frame and a detent carried by the other end of the bimetallic member, the detent engaging the second latch surface of the latch lever when the member is cool to retain the latch lever at the first limit of its longitudinal movement, means responsive to movement of the latch lever to that first limit of its longitudinal movement for switching on the bimetallic member during the heating period of operation of the control, the bimetallic member deflecting during the heat-up period of operation of the control to disengage the detent from the second latch surface to permit the latch lever to move to the other limit of its longitudinal movement, means responsive to movement of the latch lever to the other limit of its longitudinal movement for switching off the bimetallic member during the cool-down period of operation of the control, whereby cooling of said bimetallic member is effected, cooling of the bimetallic member causing it to deflect in the opposite direction, the detent during deflection in the opposite direction engaging the latch lever and pivoting the lever to disengage the second latch surface thereof from the finger, whereby the carriage is free to return to its upper non-toasting position under the biasing effect of the carriage-biasing means, and compensating means including a second bimetallic member interconnecting the biasing spring for the latch lever to the frame and adapter to vary the position of the spring connection so as to vary the bias applied to the latch lever inversely with ambient temperature, whereby the effect of the ambient temperature upon the action of the first bimetallic member is offset, and the period of engagement of the carriage in toasting position is maintained essentially constant after the temperature in the toasting compartment has stabilized.

References Cited by the Examiner
UNITED STATES PATENTS

| | | | |
|---|---|---|---|
| 973,641 | 10/1910 | Dysart | 267—1 |
| 2,271,520 | 2/1942 | Strauss | 99—329 |
| 2,584,725 | 2/1952 | McNairy | 99—329 |
| 3,029,725 | 4/1962 | Parr | 99—329 |

CHARLES A. WILMUTH, *Primary Examiner.*

LAWRENCE CHARLES, *Examiner.*

WILLIAM VAN SANTEN, STUART E. BECK,
*Assistant Examiners.*